UNITED STATES PATENT OFFICE.

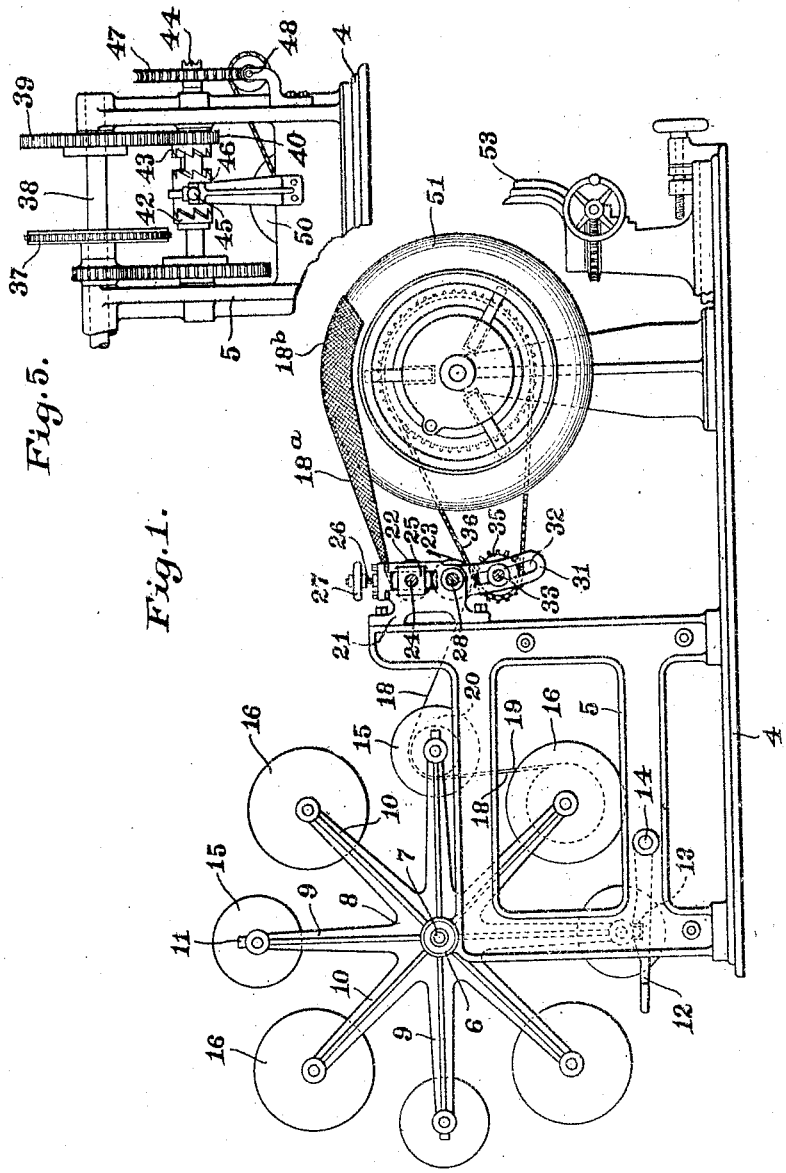
F. W. KREMER.
TIRE MACHINE.
APPLICATION FILED DEC. 12, 1914.
1,230,415.
Patented June 19, 1917.
2 SHEETS—SHEET 1.
Witnesses:
Inventor
Franklin W. Kremer
By his Attorney
W. H. C. Clarke

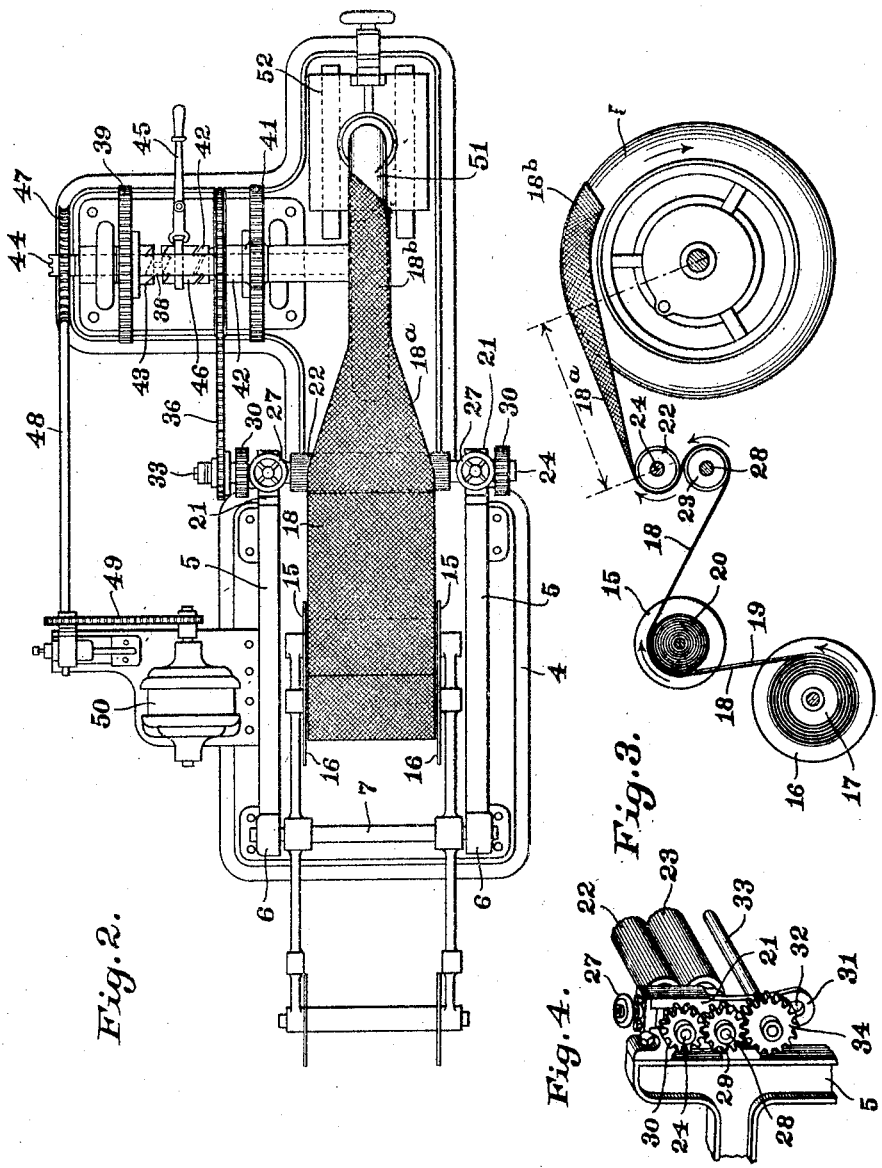

FRANKLIN W. KREMER, OF CARLSTADT, NEW JERSEY.

TIRE-MACHINE.

1,230,415.  Specification of Letters Patent.  Patented June 19, 1917.

Application filed December 12, 1914. Serial No. 876,948.

*To all whom it may concern:*

Be it known that I, FRANKLIN W. KREMER, a citizen of the United States, residing at 32 Central avenue, Carlstadt, New Jersey, have invented a certain new and useful Improvement in Tire-Machines, of which the following is a specification.

This invention relates to the production of laminated fabric casings or shoes for vehicle tires, and particularly for pneumatic and cushion tires used upon automobile wheels; one representative form of machine for producing such tires or shoes being disclosed in my application, Se. No. 714,289, filed Aug. 9, 1912, which has matured into Patent No. 1,216,329 granted Feb. 20, 1917.

In machines of the type under discussion, sheets of textile fabric permeated with rubber or composition analogous to rubber are stretched and at the same time fed on to a rotating mandrel and made to adhere to each other, the sheets as thus placed in position being shaped or formed—that is to some extent molded by pressure or impact—so as to render the tire or shoe of proper shape. In my present invention I employ a machine for feeding and stretching the fabric permeated with rubber and commonly designated as rubberized fabric, the material being fed in strips or sheets by a feeding mechanism and on to a rotating mandrel; but between the feeding mechanism and the mandrel I insert gearing for connecting the feeding mechanism and the mandrel in positive relation, so as to provide for uniformly stretching the fabric. In doing this the strip of material is stretched, in the general direction of its length, and with mathematical accuracy. While the elongation of the median portion of the material is greater than the elongation of the edge portions thereof, the elongation of the median portion and the edge portions is always in an exact and determinable ratio to the length of the material before the material is stretched. It is to accomplish this result that I employ the positive drive gearing interposed between the rotating mandrel and the feeding mechanism, and so arranged that a given degree of peripheral travel of the mandrel is inseparably associated with a similar yet exact degree of longitudinal travel of the unstretched portion of the material.

In this manner the stretching of the fabric is done uniformly and with absolute precision. As a consequence the built-up shoe or tire is rendered much stronger than would otherwise be possible, owing to the even distribution of the strains to which the fabric is subjected.

My mechanism further contemplates mechanism for enabling the operator to vary the tension placed upon the textile material, and in so doing to vary the proportionate length to which the fabric is stretched; and that, too, independently of the use of change-speed mechanism or other means for varying the general speed of the machine. Whether, therefore, the machine as a whole be run at high or low speed, the stretching of the material is always uniform, because of the above mentioned predetermined ratio of the peripheral speed of the mandrel to the length of the material before stretching, though this ratio may be varied within certain limits at the will of the operator.

Reference is made to the accompanying drawings forming a part of this specification, and in which like letters indicate like parts throughout the figures.

Figure 1 is a side elevation of the machine, certain parts being broken away;

Fig. 2 is a plan view of the machine;

Fig. 3 is a diagram of the feed mechanism and mandrel, showing how the material is handled;

Fig. 4 is a perspective of certain portions of the gearing;

Fig. 5 is a fragmentary front elevation of the machine, showing the clutch mechanism and certain parts of the driving gear.

Mounted upon a base 4 is a frame-work 5, the latter being provided with bearings 6. A shaft 7 is supported by these bearings and carries a pair of spiders 8 having arms 9—10, the arms 9 being provided with lugs 11. A foot lever 12 serving generally the purpose of a latch is provided with a notch for engaging any one of the lugs 11, the foot lever being mounted upon a pivot pin 14. The operator by depressing the foot lever may disengage the notch 13 from the adjacent lug 11 so that the spiders 10 and shaft 7 may be rotated by hand. Carried by the arms 9 are small reels 15 suitable for receiving and holding the liner or strip of material used in connection with the rubberized fabric for preventing different convolutions of the latter from sticking together, while the fabric remains in coiled form. Reels 16, somewhat larger than the reels 15 are journaled upon the arms 10, and are used for supporting coils of the rubberized fabric the convolutions of which are interspersed by convolutions of the liner in order to maintain them separate. The winding 17 (see Fig. 3) is the winding of rubberized fabric and liner just mentioned. The rubberized fabric is shown at 18, the strip of liner material appearing at 19. As the rubberized fabric is gradually unwound, (as indicated in Fig. 3), the liner 19 is wound into the form of the coil 20, and thus stored by the reel 15. As the rubberized material 18 passes through the feed mechanism and is stretched it appears as indicated at 18$^a$ in Fig. 3; and as the material is brought into engagement with the mandrel, and otherwise fitted in position as a part of the shoe or tire, it appears as shown at 18$^b$ in Fig. 3.

Mounted upon the frame-work 5 are two hangers 21 located parallel with each other. Rollers 22—23 extend between these hangers, and are parallel with each other, the roller 22 being directly over the roller 23 and being located upon a shaft 24. This shaft is mounted in bearings 25, which are adjustable by aid of screws 26, the latter being controllable by hand wheels 27. By turning these hand wheels, the pressure of the roller 22 against the roller 23 is regulated at will. The roller 23 is mounted upon a shaft 28. Gear wheels 29 mounted rigidly upon the shaft 28 mesh with gear wheels 30 carried rigidly by the shaft 24 so that the rollers 22 and 23 are thus geared positively together and turn at the same rate of peripheral speed. Connected with the brackets 21 and extending downwardly therefrom are two arms 31 each provided with a slot 32 having a general arcuate form. Extending through the two slots 32 is a shaft 33 which carries a pair of gear wheels 34. These gear wheels, however, may be removed and replaced by other gear wheels of greater or smaller diameter, as desired. The sprocket wheel 35 is mounted rigidly upon one end of the shaft 33, and is engaged by a sprocket chain 36 which also engages a gear wheel 37, the latter being mounted upon a revoluble shaft 38. A large gear wheel 39 is mounted rigidly upon this shaft and meshing with this gear wheel 39 is a gear pinion 40 located directly below it, and secured rigidly upon another revoluble shaft 44. Mounted upon this shaft is a sleeve 42, the same being keyed rigidly in position and formed into a clutch member as may be understood from Figs. 2 and 5. Another sleeve 43 encircles this shaft and it is formed into a clutch member. The shaft 44 carries a worm wheel 47 whereby it is driven. Engaging the worm wheel 47 is a worm 47$^a$ carried by a worm shaft 48. This shaft is driven by gearing 49, the latter being connected with a motor 50 or equivalent prime mover and actuated thereby. The mandrel appears at 51 and is mounted rigidly upon the shaft 38 whereby it is turned. A table 52 and tool-supporting-post 53 are employed in connection with the machine to facilitate work upon the fabric as laid or stretched upon the mandrel. The table and tool post, having no immediate or necessary relation to my invention, I will not further describe. A double clutch member 46 is attached for engagement with either of the clutch members 42 or 43, and is operated by a hand lever 45. The clutch member 46 has three normal positions; that is it may be brought into engagement with the clutch member 43 or with the clutch member 42, or located equidistant between these clutch members. The result of these three normal positions of the clutch member 46 and of three corresponding positions of the hand-lever 45 is to confer upon the machine two distinct speeds, and to give it a so-called idle position.

The operation of my device is as follows:—

The wheels 16, carrying the rolls of rubberized fabric and liner are mounted upon the arms 10, and the empty reels 15 are mounted upon the arms 9 as indicated more particularly in Fig. 1. The spiders 8 are turned one step at a time by hand, so as to bring each successive reel 16 into a predetermined position, which it occupies until the contents of the reel in question are exhausted. The rubberized fabric 18 is led upwardly and through one of the reels 15, as indicated in Fig. 1, and thence pass under the roller 23, thence upwardly and between the rollers 23 and 22, and finally over the roller 22 and into engagement with the mandrel, or material carried thereby. The liner 19 as gradually unrolled from the reel 16, is wound upon the reel 15, as indicated in Fig. 3. The pressure between the rollers 22 and 23 having been adjusted by aid of the hand wheels 27, as above described, and the various other parts being adjusted and arranged as stated, the machine is started into action, at a speed controllable by the hand lever 45. The sprocket wheel 37 drives the sprocket chain 36 which occupies the sprocket wheel 35 and causes the shaft 33 to rotate. While the speed of the sprocket wheel 35 has a ratio relatively to the speed of the sprocket wheel 37, the speed of the rollers 22 and 23, and consequently the traveling speed of the rubberized material, is dependent upon the diameters of the gear wheels carried by the shaft 33, which are removable and replaceable as above described. Therefore, the relative speed of travel of the rubberized material, before it leaves the rollers 22 and 23, may be varied to some extent, at the will of the operator, relatively to the peripheral speed of the mandrel. This fact is of significance, in that it enables the degree of stretching of the rubberized material to be controlled at will, within certain limits, and further enables this control of the degree of stretching to be rendered independent of the general speed at which the machine is driven.

The peripheral speed of the mandrel 51 is greater than the speed of travel of the rubberized material 18, before this material leaves the rollers 22 and 23, therefore, the rubberized material is stretched. Owing to the convex or rounded form of the mandrel, the edges of the rubberized material are not stretched as much as the median portion of the material, and this fact enables the material to assume suitable form for the shoe. As the gearing interposed between the mandrel and the feed rollers 22 and 23 is positively connected up, and as the rollers 22 and 23 are positively driven by said gearing, including the sprocket wheel 35 and chain 36, it follows of necessity, that the degree of stretching to which the rubberized fabric is subjected is always the same, except where purposely varied at the will and pleasure of the operator. This is a fact of great importance. If the rubberized material be so disposed that at one time the material is stretched more than at another, so that the composite mass thus built up of the rubberized material is not properly tensioned internally, the shoe is apt to warp and twist or otherwise become distorted, and different portions of the fabric are subjected to undesirable and unnecessary strain. Plainly the best distribution of internal strains possible is effected by feeding the material uniformly and by stretching it in a predetermined ratio which is constant, other things being equal.

While in this instance the chief elements of the feed mechanism are rollers, I do not limit myself on this account as the material may be fed otherwise than by rollers. Neither do I limit myself to the precise form of gearing shown as variations may be made in the construction without departing from the spirit of my invention.

Having thus described my invention what I claim as new and desire to secure by Letters Patent is as follows:—

1. A device of the character described comprising a rotating mandrel, a pair of rollers for engaging a rubberized fabric and feeding the same on to said mandrel, means for adjusting one of said rollers relatively to the other, gearing members connecting said rollers together so as to render positive their movements relatively to each other, and mechanism connected with said mandrel and driven thereby, said mechanism also being connected to said gear members for driving said rollers, the proportions of the parts being such that said fabric, after leaving said rollers and before contacting with said mandrel, is stretched.

2. A tire machine comprising a rotating mandrel, a sprocket wheel connected to rotate therewith, a supplemental shaft having a sprocket wheel thereon, a sprocket chain connecting said sprocket wheel, a removable gear wheel on said supplemental shafts, and a pair of fabric clamping rollers geared up with said gear wheel and with each other.

3. A tire building machine embodying a power driven ring core, a stock roll for carrying sheeted tire material, feed rolls geared together for delivering the material from the stock roll in a circuitous path to the ring core, a drive shaft geared to the feed rolls for rotating the feed rolls, means for driving the ring core, and means for positively driving said drive shaft from said core driving means.

In testimony whereof, I have signed my name to this specification in the presence of two subscribing witnesses, this 25th day of August 1914.

FRANKLIN W. KREMER.

Witnesses:
H. BIRNBACH,
WM. F. NICKEL.